P. PHILIP.
Method of Operating Windlasses.
No. 5,304. Reissued March 4, 1873.
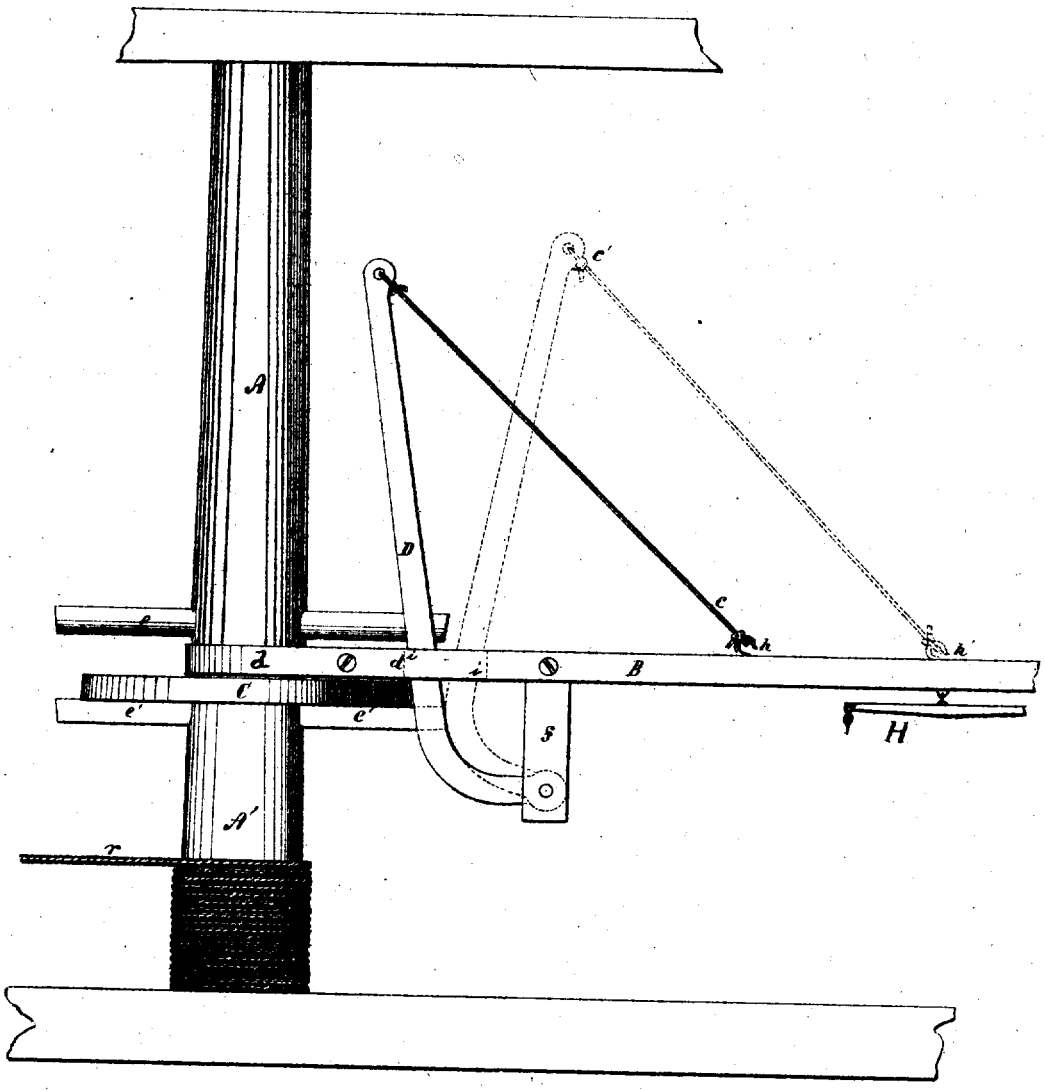
WITNESSES:
Herm. Lauten
Wm. G. Henderson
INVENTOR:
Peter Philip
By Daniel Breed
Atty.
AM. PHOTO-LITHOGRAPHIC CO. N.Y. (OSBORNE'S PROCESS)

UNITED STATES PATENT OFFICE.

PETER PHILIP, OF GHENT, NEW YORK.

IMPROVEMENT IN THE METHODS OF OPERATING WINDLASSES.

Specification forming part of Letters Patent No. 24,755, dated July 12, 1859; reissue No. 5,304, dated March 4, 1873.

*To all whom it may concern:*

Be it known that I, PETER PHILIP, of the town of Ghent, county of Columbia, State of New York, have invented certain new and useful improvements in horse-power windlasses for operating hay-presses, or other purposes, where the uncoil of the rope is required or is to be regulated; and the following is a specification, reference being had to the drawing and the letters marked thereon.

A is the shaft; A′, the drum on which the rope or chain is wound. B is the loose or broom sweep, to which the horse is attached. C is a circle or friction wheel. D is an adjusting-lever for attaching the sweep to the drum. *e e′* are arms, behind which the lever is secured. The shaft A may be made of either wood or iron, the drum A′ forming a fixed part thereof. A box, *d*, is formed at one end of the sweep B, and a corresponding journal on the shaft or drum, so that the sweep is loose and independent of the drum and shaft in its operation, except when attached to the shaft or drum for operation through means of the lever D and arms *e e′*. The table or friction-circle C is secured to the shaft or drum, and the sweep is used as a lever to produce the necessary friction against it to prevent the too-rapid uncoil of the rope *r*.

In order that my improvements may be the more clearly defined, I will state that the ordinary method of constructing horse-power windlasses is to attach the sweep firmly either to the shaft or drum, and it is at no time during the operation detached; while with my improvements the sweep is always loosely attached to admit of the uncoil, except when adjusted for operation.

In operation the horse is attached at the end of the sweep B at H, and the lever D is moved behind the arms *e*, thus attaching the sweep to and revolving the shaft A and drum A′, and winding the rope upon the drum, as shown. In reversing, the lever D is withdrawn, thus relieving the shaft and drum in the slot *i*, shown by dotted lines; and to prevent the too rapid uncoil of the rope *r*, the sweep B is used as a lever to produce friction, on the circle C.

Having thus fully described my invention, I claim, in horse-power windlasses, as follows:

1. The sweep or horse lever B, when loosely attached in its bearing to the shaft or drum, for the purpose set forth.

2. The loose sweep B as combined horse and friction lever.

3. The combination of the loose sweep B, shaft A, drum A′, arm *e*, and lever D, or equivalent adjusting attachments, substantially for the purpose set forth.

PETER PHILIP.

Witnesses:
A. M. DEDERICK,
DAVID DE TIERE.